United States Patent
Rich

[11] 3,982,165
[45] Sept. 21, 1976

[54] APPARATUS FOR DIGITIZING AND PLOTTING

[75] Inventor: Leonard G. Rich, West Hartford, Conn.

[73] Assignee: The Gerber Scientific Instrument Company, South Windsor, Conn.

[22] Filed: Sept. 10, 1974

[21] Appl. No.: 504,844

[52] U.S. Cl. .............................. 318/568; 178/18; 346/31; 318/577; 318/647; 318/675
[51] Int. Cl.² ........................................ G05B 19/36
[58] Field of Search ........... 318/568, 605, 654, 653, 318/647, 608, 567, 569, 162, 576, 577, 675; 178/18, 19; 346/31

[56] References Cited
UNITED STATES PATENTS

| | | | |
|---|---|---|---|
| 3,636,256 | 1/1972 | Cameron | 178/18 |
| 3,876,831 | 4/1975 | Wickham et al. | 178/19 |

*Primary Examiner*—Gerald P. Tolin
*Assistant Examiner*—John J. Feldhaus
*Attorney, Agent, or Firm*—McCormick, Paulding & Huber

[57] ABSTRACT

An apparatus capable of digitizing or plotting coordinate locations and lines utilizes an automatically controlled carriage that is translated over the supporting surface of a digitizing and plotting table and a free cursor for identifying specific coordinate locations on the table. Radiation means, such as electromagnetic coils, are mounted on the carriage and the cursor to produce signals indicative of the relative positioning of the carriage and cursor during a digitizing mode of operation. The position signals are transmitted to controlled drive motors which cause the carriage to follow the cursor over the supporting surface. Encoders, also operated by the drive motors, allow the position of the carriage and, hence, the cursor to be recorded for subsequent usage. A plotting instrument such as a pen is mounted on the carriage so that the apparatus can be used in a plotting mode of operation to generate graphic information.

17 Claims, 5 Drawing Figures

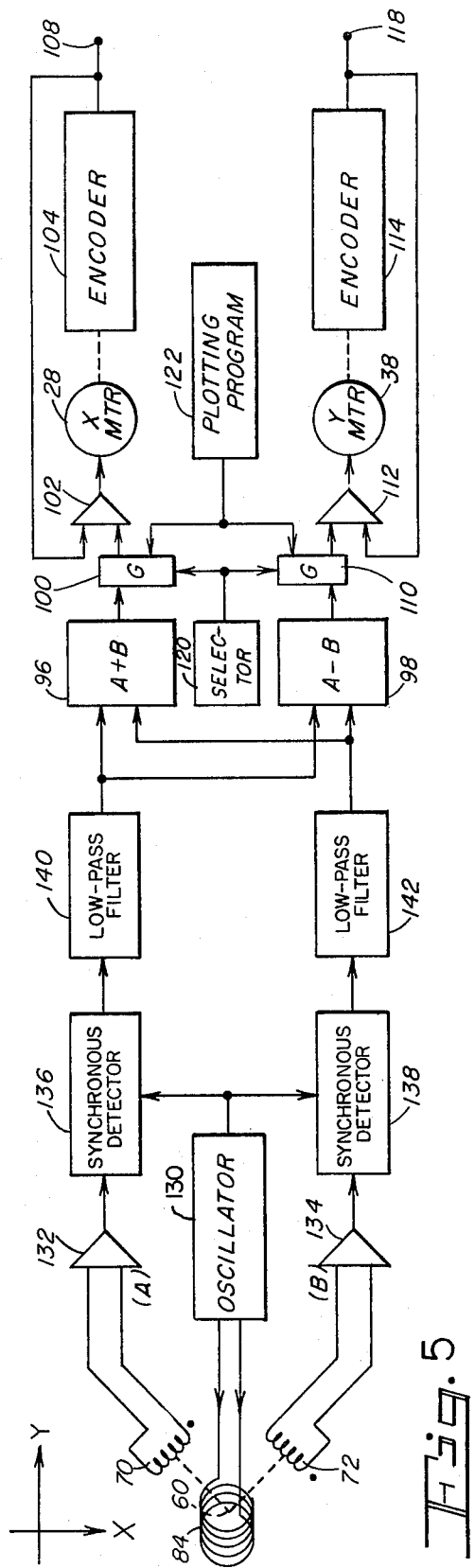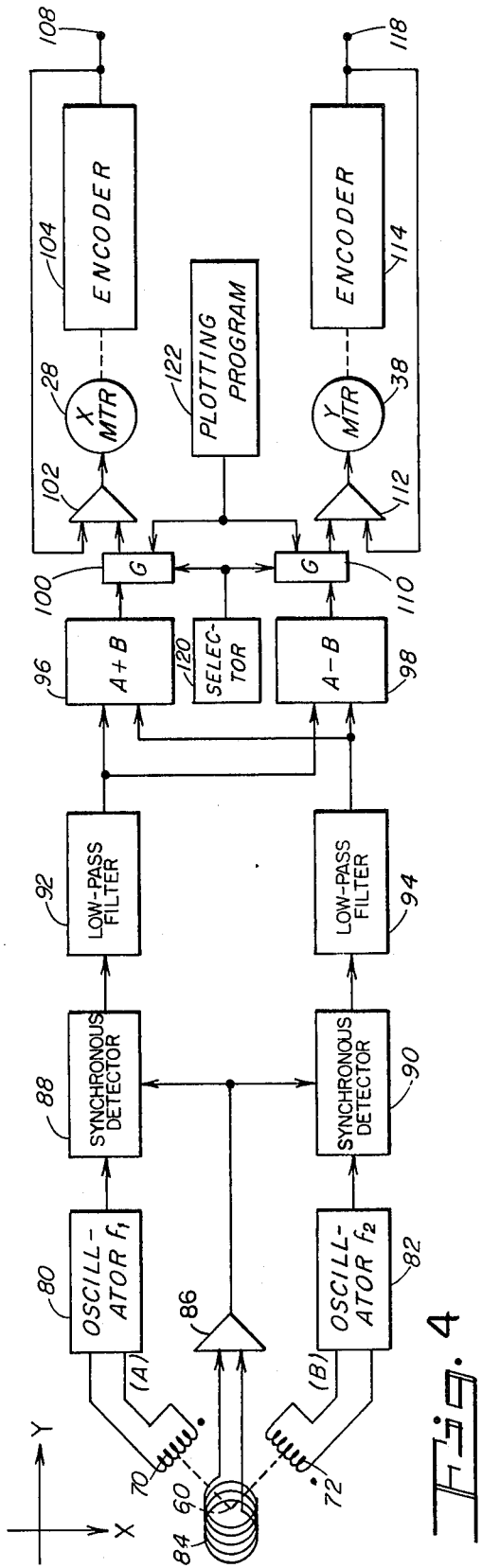
Fig. 5
Fig. 4

APPARATUS FOR DIGITIZING AND PLOTTING

BACKGROUND OF THE INVENTION

The present invention relates to information handling systems and, more particularly, it is concerned with an apparatus that is capable of both digitizing and plotting graphic information on sheet material.

U.S. patent application Ser. No. 377,769, filed July 9, 1973 and entitled "Interactive Graphic System" discloses an information processing system including a plotting table having a manually operable cursor for digitizing graphic information defined on sheet material spread on the table. Digitizing, as used in this application, refers to the reduction to point-data of continuous or intermittent graphic characters such as lines and intersections. Such reduction of graphic information to point data represented by electrical or other signals is necessary for handling and processing the information in computers or transmission equipment in a recognizable and easily utilized form.

The apparatus shown in the above-identified application is also capable of plotting graphic information from electrical or other signals produced by a computer or a memory device in which plotting programs are held in either temporary or permanent storage. Plotting may be considered to be the converse of digitizing to the extent that point data is converted from an electrical or other signal to a graphic form.

The cursor shown in the above-identified application is mechanically suspended from the carriage that carries the plotting pen which thereby limits the ease with which the cursor can be moved to different coordinate locations on sheet material bearing graphic information. To a lesser degree, the mechanically attached cursor also reduces the ability of the plotting instrument to be moved or accelerated over a plotting surface because of the inertia added to the carriage by the cursor.

A system having a free cursor is more responsive in that carriage movements are faster parallel to the sheet material receiving or bearing graphic information. Prior art apparatus having a free cursor for digitizing alone is shown in U.S. Pat. No. 3,636,256 entitled "Chart-Reading Apparatus". The cursor is manually moved over a supporting surface on which sheet material bearing graphic information is positioned and an electromagnetic coil on the cursor is connected to synchronous detection circuitry for determining the location of the cursor on the supporting surface. A movable carriage is mounted below the supporting surface and carries electromagnetic field coils which induce currents in the coil on the cursor. By selectively exciting the electromagnetic field coils on the carriage, it is possible to determine the relative positioning of the carriage and cursor and to slave the carriage to follow the cursor movements on the supporting device. Positioning the cursor on selected locations and recording the carriage positions which correspond with the cursor positions digitizes the selected locations.

Although the carriage below the supporting surface provides a surface which is completely exposed and unobstructed, the utility of the apparatus is limited to the digitizing function. Since the principal components of a plotting instrument are provided by the supporting surface, the carriage which is movable in two coordinate directions parallel to the supporting surface and the servo-drive mechanism which controls the movements of the carriage, it would be advantageous if the apparatus could be redesigned to perform both digitizing and plotting operations.

It is accordingly a general object of the present invention to disclose a servocontrolled mechanism which is capable of use as a digitizer or a plotter.

SUMMARY OF THE INVENTION

The present invention resides in an apparatus that is capable of either digitizing or plotting graphic information on sheet material. The apparatus has a plotting and digitizing table over which a carriage is translated by means of servomotors in the customary manner of many automatically controlled plotters known in the art.

An improvement incorporated in the plotter includes a free, manually movable cursor positionable on the supporting surface of the plotting table to identify coordinate locations on the table surface or sheet material positioned on the surface in a digitizing mode of operation. Radiation emitting and sensing means preferably taking the form of electromagnetic coils are mounted on the cursor and the carriage above the supporting surface of the table for detecting the positioning of the cursor and carriage relative to one another. Signals derived from the sensor represent the relative positioning and are utilized as input signals to drive means including the servomechanism which moves the carriage. When applied to the servomechanism, the signals cause the carriage to move toward a preselected position relative to the cursor on the supporting surface. The carriage is therefore slaved to track motions of the cursor over the supporting surface in a digitizing mode of operation.

In a plotting mode of operation, the free cursor is simply removed from the table and a pre-programmed or "on-line" plotting program is applied to the servomechanism to control carriage motions. A plotting instrument, for example a plotting pen, is mounted on the carriage and engages the sheet material on the surface to produce a graphic representation of the program.

In an apparatus having a free cursor, therefore, both the digitizing and plotting functions can be performed by selecting one or the other modes of operation.

BRIEF DESCRIPTION OF THE DRAWINGS

FIG. 4 is a block diagram schematically illustrating the control mechanism for the plotting and digitizing apparatus in one embodiment of the invention.

FIG. 5 is another block diagram schematically illustrating a control mechanism for the plotting and digitizing apparatus in another embodiment of the invention.

DESCRIPTION OF THE PREFERRED EMBODIMENTS

Figures 1, 2, 3:
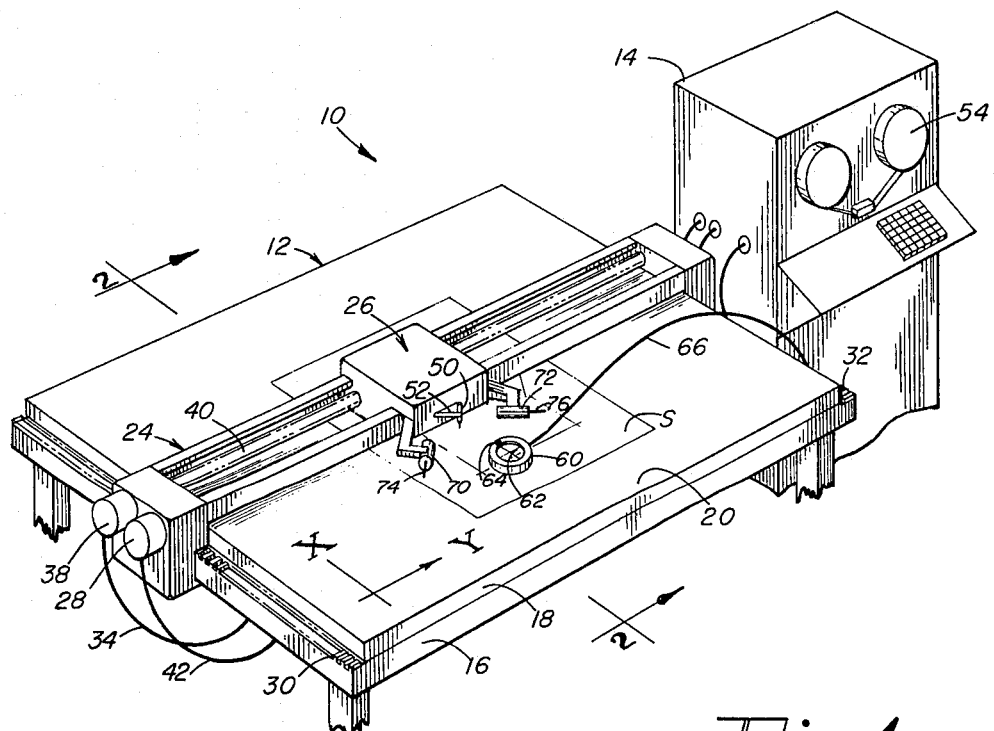
FIG. 1 is a perspective view showing the combined plotting and digitizing apparatus of the present invention.
FIG. 2 is a horizontal cross sectional view of the plotting and digitizing apparatus as viewed along the sectioning line 2—2 of FIG. 1.
FIG. 3 is also a horizontal cross sectional view of the plotting and digitizing apparatus showing an alternate embodiment of the invention.

FIG. 1 illustrates an automatically controlled apparatus for both digitizing and plotting in accordance with the present invention. The apparatus, generally designated 10, is comprised basically of a digitizing and plotting table 12 and a control computer 14 for regulating the operation of components on the table in both the digitizing and plotting modes of operation.

The table 12 includes a frame 16 and a support bed 18 mounted on the frame. The bed defines a supporting surface 20 on which sheet material S bearing or receiving graphic information is spread in a flattened condition. The bed 18 may incorporate a vacuum holddown system for holding the sheet material S fixedly in position on the surface 20 during both digitizing and plotting operations. The surface 20 of the bed 18 must be of a hardness adequate to allow line traces to be drawn on the sheet material S when a plotting instrument such as a pen or pencil is translated over the material. In one form, the bed could comprise a hard rubber mat containing perforations and resting on a grooved plate connected with a vacuum pump as shown in U.S. Pat. No. 3,477,322.

A carriage mechanism including an X-carriage 24 and a Y-carriage 26 is mounted above the support surface 20 for movement over sheet material spread on the surface. The X-carriage 24 is movable back and forth over the surface 20 in the illustrated X-direction and the Y-carriage 26 is mounted on the X-carriage and movable relative to the X-carriage and the surface 20 in the illustrated Y-direction. The Y-carriage is, accordingly, movable in both X and Y-directions and is, therefore, capable of moving to any coordinate location within a work area on the supporting surface 20.

The X-carriage 24 has an X-drive motor 28 which is a reversible servo-motor controlled by the computer 14 to move the carriage 24 in the X-direction. The drive motor 28 rotates pinions (not shown) engaging racks 30 and 32 at opposite sides of the table 12. A cable 34 between the motor 28 and the computer 14 transmits command signals and position feedback information to and from a closed servoloop in the computer to permit the X-carriage 24 to be accurately positioned in the X-coordinate direction.

Similarly, a Y-drive motor 38 is mounted on the X-carriage 24 and is threadably engaged with the Y-carriage 26 by means of a lead screw 40 to locate the Y-carriage on the X-carriage and over the surface 20 in the Y-coordinate direction. A cable 42 transmits command signals and feedback information between the motor 38 and a closed servoloop in the computer 14 in a manner similar to the cable 34.

Mounted on the Y-carriage 26 is a plotting instrument taking the form of a pen 50. The pen is mounted to the carriage 26 by means of a pivoting lever 52 also controlled by the computer 14 so that the pen 50 can be lifted in and out of writing engagement with the sheet material S during the plotting mode of operation. Of course, when a plot is not being made, the pen 50 is held out of engagement with the sheet material.

The above-described apparatus includes all the equipment necessary to generate graphic information or plots on the sheet material S in response to either an "on-line" plotting program supplied to the computer 14 or a pre-recorded plotting program stored, for example, in the computer memory or in a program tape 54 read by the computer 14. The computer 14 is first placed in a plotting mode of operation and command signals derived from the plotting program are transmitted to the pen 50 and carriages 24 and 26 to reproduce the program in graphic form on the sheet material. The term "sheet material" as used herein is intended to encompass not only paper but other materials such as photographic plates that are exposed by a photohead mounted on the Y-carriage 26 in place of the pen.

Another important function performed by the apparatus 10 is digitizing graphic information that has been initially provided on the sheet material S. To this end, a free cursor 60 having a visible index or reticle 62 is provided to identify specific coordinates in the graphic information on the table 12. The cursor 60 is manually moved over the graphic information by a human operator until the reticle is centered over a point to be digitized. When the operator is satisfied that the recticle and the point are in registry, he presses a digitizing button 64 electrically connected to the computer 14 by a cable 66 and the coordinates of the point are recorded in a memory of the computer 14 as described in greater detail below. A plurality of digitizing buttons might be provided if desired to record, for example, the beginning of a line, intermediate and end points of a line, and isolated coordinates not associated with a line. The digitized data is then used for any desired purpose such as generating plotting or cutting programs by means of other data processing equipment.

The cursor 60 is a "free" cursor because it is not mechanically or structurally connected to any portion of the bed 18 or the carriages 24 and 26 of the table 12. A free cursor of this type is advantageous since the human operator can move the cursor over the supporting surface 20 without the impediments of other attached mechanical structure.

The precise location of the cursor 60 on the supporting surface 20 is determined by means of a radiation emitter and sensor mounted on the Y-carriage 26 and cursor 60. In a preferred form of the invention, the radiation is electromagnetic and the emitter includes an electromagnetic coil producing a magnetic field between the carriage 26 and the cursor 60. An electromagnetic sensor, also having a coil, detects the relative positioning of the carriage 26 and cursor 60 to produce signals which drive the motors 28 and 38 and move the carriage 26 toward a preselected position relative to the cursor. As long as the preselected positioning is maintained, the location of the carriage 26 fixes the position of the cursor and permits the cursor position on the surface 20 to be determined and recorded.

In one form of the invention, electromagnetic radiation is emitted by two similarly constructed field coils 70 and 72 mounted respectively on arms connected to the Y-carriage 26 in FIG. 1 and the radiation is detected by another coil (not visible) on the cursor. The coils 70 and 72 are positioned on the carriage 26 at the same height above the supporting surface 20 and in horizontally spaced relationship. The principal axes 74 and 76 of the coils intersect in perpendicular relationship to each other and are parallel to the surface 20. The principle axis of a coil is the axis that is concentric with each loop of the coil windings. The coils 74 and 76 are further positioned relative to one another and the Y-carriage 26 so that the central planes of the coils perpendicular to the axes 74 and 76 extend at 45° to the X and Y-coordinate axes of the table 12 and intersect in a line perpendicular to the surface 20. The planes also pass through the center point of the reticle 62 when the carriage is at a preselected position relative to the cursor 60. This preselected position is that toward which the carriage 26 is driven by the drive motors 28 and 38 during a digitizing mode of operation.

FIGS. 2 and 3 illustrate the coils 70 and 72 mounted in two different manners which are suitable for practicing the present invention. In FIG. 2, the coil 70 (and the coil 72 not shown) is suspended relatively close to the supporting surface 20 of the table 12 to provide maximum magnetic coupling between the coil and cursor 60. In FIG. 3, however, the coils are elevated above the surface 20 and allow the cursor 60 to be moved relatively close to the Y-carriage 26 without physical interference with the coils.

FIG. 4 shows one embodiment of the control system which permits both digitizing and plotting to be performed on the table 12. The electromagnetic coils 70 and 72 are electrically excited by means of oscillators 80 and 82 respectively to induce electrical currents in another coil 84. The coil 84 is mounted on and wound around the cursor 60 with the principal axis of the coil perpendicular to the surface 20. The oscillator 80 operates at a frequency, $f_1$ in the order of 10 kc. The oscillator 82 operates at another frequency, $f_2$ which is slightly different from the frequency $f_1$, for example, $f_1 \pm 2$ kc. The coils 70 and 72, therefore, are energized at slightly different frequencies and induce characteristic currents in the other coil 84 mounted on the cursor 60. The coil 84 serves as a sensor of the electromagnetic radiation.

If the carriage 26 and coils 70 and 72 are located in the preselected positional relationship with the cursor 60, the relationship placing the cursor at the intersection of the dotted perpendicular lines from the coils in FIG. 4, then predetermined characteristic currents will be induced in the coil 84 and transmitted by amplifier 86 to synchronous detectors 88 and 90. The oscillator frequencies $f_1$ and $f_2$ are supplied respectively to the detectors 88 and 90 as reference frequencies and the output signals from the detectors correspond respectively to departures of the cursor 60 from the predetermined position relative to the coils 70 and 72 and the Y-carriage 26 or conversely, the departure of the carriage from the preselected positional relationship with the cursor. The detector signals pass respectively through filters 92 and 94 into a resolving network formed by summing circuits 96 and 98.

The resolving network is required due to the fact that the coils 70 and 72 have their principal axes arranged at 45° to the X and Y-coordinate axes with which the drive motors 28 and 38 are associated. If the coils 70 and 72 had principal axes oriented parallel with the X and Y-coordinate axes, then the resolving network could be eliminated. The summing circuit 96 algebraically adds the two filtered signals from the detectors 88 and 90 and develops an X-axis error signal that is transmitted through a gate 100 during the digitizing mode of operation to an amplifier 102. The amplifier 102 operates the X-axis drive motor 28 which positions the X-carriage 24 at its preselected position relative to the cursor. A feedback transducer or encoder 104 is also driven by the motor 28 and produces an electrical output that is used as the feedback signal to the amplifier 102 as in a standard closed loop positioning mechanism. The electrical output of the encoder 104, however, is also applied to a terminal 108 which is "read" whenever the digitizing button 64 of the cursor is pressed to store the X-coordinate location corresponding to that of the carriage.

It is to be understood that the cursor 60 and X-carriage 28 or more particularly the pen 50 have a predetermined offset along the X-axis when the cursor and carriage are in their preselected positional relationship. To insure that the digitized coordinate corresponds to the cursor position rather than the pen position, the encoder can be preset at the beginning of each digitizing operation by an amount equal to the pen-cursor offset along the X-axis.

In a similar manner, the summing circuit 98 algebraically subtracts the signals from the coils 70 and 72 and produces a Y-axis error signal that is transmitted through a gate 110 and amplifier 112 to the Y-drive motor 38. An encoder 114 similar to the encoder 104 is driven by the motor 38 and provides both a feedback and a digitizing signal at its output. The digitizing signal is "read" at the terminal 118. Since there is no offset of the cursor 60 and pen 50 along the Y-axis in the apparatus shown in FIG. 1, it is not necessary to preset the encoder 114 at the beginning of each digitizing operation.

The gates 100 and 110 allow the table 12 to be used alternately for digitizing and plotting. The cursor position signals are transmitted to the amplifiers 102 and 112 by the gates 100 and 110 respectively when a selector 120 is manually set for digitizing. When the selector is set for plotting, signals from a plotting program device 122, which may include portions of the computer 14 in FIG. 1, are transmitted through the gates 100 and 110 to the amplifiers 102 and 112 instead of the cursor position signals. The plotting program device 122 would also periodically transmit control signals to the lever 52 on the Y-carriage in FIG. 1 to cause the pen 50 to move into and out of writing engagement with the sheet material in the course of a plotting operation. Of course, during a plotting operation, the cursor 60 would be removed from the sheet material.

FIG. 5 discloses another embodiment of the control system that can be used with the table 12 and free cursor 60 for both digitizing and plotting. The resolving network including circuits 96 and 98, the selector 120, the gates 100 and 110 and the servomechanism for the X- and Y-drive motors 28 and 38 bear the same reference numerals and function in the same manner as the corresponding components in FIG. 4.

In the embodiment of FIG. 5, electromagnetic radiation is also transmitted between the coils 70, 72 and 84 on the carriage 26 and cursor 60 during the digitizing mode of operation; however, the emitting coil or the coil generating a magnetic field between the cursor and carriage is the cursor coil 84 and the coils 70 and 72 serve as sensing coils.

A single oscillator 130 is connected to the coil 84 wound on the cursor 60 and during digitizing excites the coil at a frequency of approximately 10 kc. Currents representative of the relative positioning of the cursor 60 and carriage 26 are induced in the respective coils 70 and 72, and the induced currents are then transmitted through signal amplifiers 132 and 134 as inputs to synchronous detectors 136 and 138 respectively. The oscillator 130 is also connected to the detectors to provide a reference signal. Filters 140 and 142 receive the demodulated outputs of the detectors 136 and 138 and the filtered signals are then applied to the resolving network including circuits 96 and 98 for controlling the drive motors 28 and 38 and carriage positions in the same manner as described above in connection with FIG. 4. The obvious advantage of the system in FIG. 5 is that a single oscillator 130 is utilized instead of the two oscillators 80 and 82 operating at different frequencies.

It will thus be seen that an apparatus is disclosed having a single table that can be used for both digitizing and plotting operations. During digitizing, the free cursor 60 is manually positioned on sheet material bearing graphic information and the carriage which supports the plotting instrument or pen 50 is slaved to follow the cursor movements so that carriage position signals produced by the encoders 104 and 114 may be read and recorded. The unique positioning of the coils 70 and 72 on the carriage 26 permits the carriage to be mounted above the table, and the mounting of the carriage in this manner permits both digitizing and plotting operations to be carried out by the same basic apparatus.

While the present invention has been described in several preferred embodiments, it should be understood that still further modifications and substitutions can be had without departing from the spirit of the present invention. For example, instead of using two oscillators 80 and 82 with different characteristic frequencies as shown and described in connection with the embodiment of FIG. 4, a single oscillator could be used by exciting one of the coils 70 and 72 directly and exciting the other of the coils through a 90° phase-shifting amplifier. The detectors 88 and 90 would receive as reference signals the excitations applied to the respective coils to which the detectors are connected. Also, the positioning of the coils 70 and 72 so that the principal axes are oriented at 45° to the X- and Y-coordinate axes is not essential but desirable since it locates the coils symmetrically about the cursor 70 relative to the operator that positions the cursor during a digitizing process. If the principal axes of the coils are aligned with the X- and Y-axes, then the resolving networks disclosed in FIGS. 4 and 5 may be deleted as described. Accordingly, the present invention is described in a preferred embodiment by way of illustration rather than limitation.

I claim as my invention:

1. In a device having a support table and a carriage translatable by means of a servomotor over an exposed supporting surface defined on the table, the improvement comprising:
    a manually movable cursor freely positionable on the exposed supporting surface of the table and having a visible index to identify coordinate locations on the surface;
    electromagnetic radiation means carried above the exposed supporting surface of the table on both the carriage and the movable cursor for detecting the positioning of the cursor and carriage relative to one another and producing corresponding relative position signals identifying the location of the index relative to the carriage, the radiation means being mounted in unobstructing relationship with the visible index of the cursor when viewed from above the supporting surface; and
    drive means connected to the support table and the carriage and responsive to the position signals from the electromagnetic radiation means for moving the carriage toward a preselected position relative to the cursor on the exposed supporting surface of the table.

2. The improvement of claim 1 wherein:
    the electromagnetic radiation means comprises an electromagnetic coil connected to the manually movable cursor and carried over the supporting surface of the table by the cursor.

3. The improvement of claim 1 wherein:
    the electromagnetic radiation means comprises two electromagnetic coils mounted on the carriage over the supporting surface of the table with the principal axes of the coils oriented at an angle to one another and parallel to the supporting surface.

4. The improvement of claim 3 wherein the electromagnetic means also includes an electromagnetic coil on the cursor.

5. The improvement of claim 1 wherein the elctromagnetic means comprises:
    two electromagnetic coils of similar construction mounted on the carriage above the supporting surface of the table and having the principal axes of the coils oriented parallel to the surface and perpendicular to each other, the coils also being located in spaced relation from one another and at the same elevation above the supporting surface; and
    another electromagnetic coil mounted on the cursor.

6. The improvement of claim 5 in the device in which the carriage translates relative to the supporting surface of the table along X- and Y-coordinate axes wherein:
    the two electromagnetic coils mounted on the carriage have principal axes lying in planes oriented at 45° to the X- and Y-axes; and
    the drive means includes servomotors for the X- and Y-axes respectively and resolving means connected with the electromagnetic means for associating the coils with the respective servomotors of the X- and Y-axes.

7. The improvement of claim 5 wherein:
    the electromagnetic means includes means for electrically energizing the two electromagnetic coils on the carriage with characteristically different excitations; and
    the drive means includes detection means connected with the electromagnetic coil on the cursor for sensing the portions of the different excitations induced in the coil on the cursor.

8. The improvement of claim 7 wherein:
    the means for electrically energizing includes two electrical oscillators producing characteristically different frequencies.

9. The improvement of claim 5 wherein:
    the electromagnetic means includes means for electrically energizing the electromagnetic coil mounted on the cursor; and
    the drive means includes detection means connected with the electromagnetic coils of the carriage for sensing the excitation induced in the respective coils by the coil on the cursor.

10. The improvement of claim 5 wherein the principal axis of the coil on the cursor is oriented perpendicular to the supporting surface.

11. An apparatus for both digitizing coordinate locations and plotting comprising:
    means defining a supporting surface on which sheet material suitable for defining a graphic display may be laid;
    a carriage mounted above the surface for movement over various coordinate locations on the surface;
    controlled drive means connected with the carriage for moving the carriage over the surface;
    a plotting instrument mounted on the carriage for movement with the carriage and for producing graphic information on the sheet material on the supporting surface;

a free cursor manually movable over the sheet material on the supporting surface to identify coordinate locations on the material and surface; and radiation means operatively associated with both the carriage and the cursor for producing signals representative of the relative positioning of the cursor and carriage.

12. Apparatus for digitizing and plotting as defined in claim 11 and further including:

program means for producing a plotting program; and selector means for connecting either the radiation means or the program means to the controlled drive means.

13. Apparatus for digitizing and plotting as defined in claim 11 wherein:

the radiation means comprises an electromagnetic radiation emitter and sensor.

14. Apparatus for digitizing and plotting as in claim 13 wherein:

the electromagnetic radiation emitter is mounted on the carriage; and the sensor is mounted on the cursor.

15. Apparatus as defined in claim 14 wherein:

the radiaton emitter comprises two similar and spaced field coils mounted on the carriage with the principal axes of the coils intersecting in angular relationship and parallel to the supporting surface.

16. Apparatus for digitizing and plotting as in claim 13 wherein:

the electromagnetic radiation emitter is mounted on the free cursor; and the sensor is mounted on the carriage.

17. Apparatus for digitizing and plotting as in claim 16 wherein:

the sensor is comprised of two similar and spaced coils mounted on the carriage with the principal axes of the coils intersecting in angular relationship and parallel to the supporting surface; and the emitter comprises an electromagnetic coil mounted on the cursor.

* * * * *